Sept. 17, 1963 P. BOSSU 3,104,277
FLUID-TIGHT LEAD-OUT DEVICE FOR AN ELECTRIC CONDUCTOR
Filed April 5, 1960
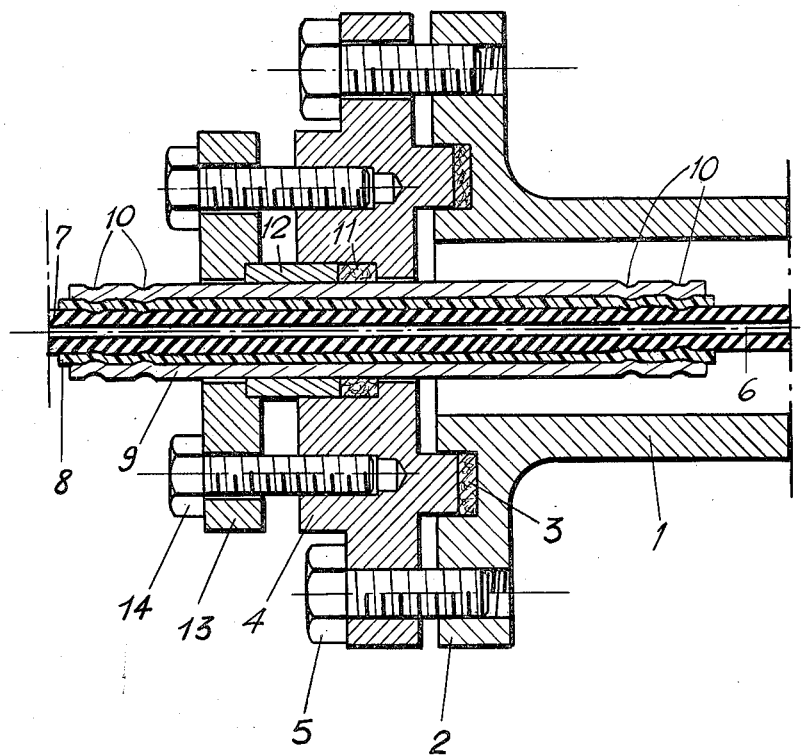
INVENTOR
PIERRE BOSSU
BY *Craig and Freudenberg*
ATTORNEYS 3,104,277
FLUID-TIGHT LEAD-OUT DEVICE FOR AN
ELECTRIC CONDUCTOR
Pierre Bossu, Francheville, France, assignor to Compagnie Generale d'Electricite, Paris, France
Filed Apr. 5, 1960, Ser. No. 20,043
Claims priority, application France May 2, 1959
5 Claims. (Cl. 174—151)

For reasons of economy and safety, the idea has been conceived of disposing within the ducts employed to carry liquids or gases the electric conductor or conductors necessary for the supply of electrical energy and for the control of the signalling devices located at great distances.

The wires or strands thus formed possess a conductive metal core coated with a continuous insulation consisting of fluid-tight material.

The present invention has for its object to make it possible to lead out without appreciable leakage one or more electric conductors situated in such a forced (sic) duct. It also has the object of forming this fluid-tight lead-out through a small surface.

This invention concerns a fluid-tight outlet device for an electric conductor, characterised in that the conductor or conductors to be led out are insulated by a coating of insulating material and are provided, level with the fluid-tight lead-out device, with a tube of plastic material slid on to the insulation of the conductor and with a metal tube slid on to the tube of insulating material and of equal length thereto.

Further features of the invention will become apparent from the following description of an embodiment and from the accompanying drawing, the single FIGURE of which is a longitudinal sectional view of a fluid-tight lead-out device for an electric conductor situated in a forced duct.

A metal sleeve 1 is welded or screwed to the forced duct and comprises at its end a flange 2 formed with an annular groove in which is disposed a packing 3.

A counter-flange 4 comprises an annular rib, which is gripped on the packing 3 with the aid of screws 5.

An electric conductor 6 coated with an insulating material 7 extends out of the forced duct through the sleeve 1 and through the counter-flange 4.

Level with the lead-through aperture, a tube 8 of plastic material is slid on to the insulation 7 around the conductor 6. A drawn metal tube 9 of the same length as the tube 8 is slid on to the latter and is gripped on each end thereof by one or more annular grooves 10 with the aid of a special pincer device. The tube 8 of plastic material is thus compressed on the insulation 7 by means of this gripping action and thus affords complete fluid-tightness.

The outlet orifice extending through the counter-flange 4 comprises on the outer face of the latter an annular recess, within which there are fitted a plastic packing 11 and a metal ring 12 which are slid around the metal tube 9.

A flange 13 is centered on the ring 12 and compresses the plastic packing 11 in its recess with the aid of locking screws 14.

In order to simplify the illustration in the drawing, the case has been envisaged in which only one conductor has to be led out, but it is obvious that the counter-flange 4 and the flange 13 may have as many outlets as there are conductors to be led out of the forced duct, these outlets being preferably situated at equal distances from the axis of the whole arrangement.

I claim:

1. A fluid-tight lead-out device comprising at least one cable adapted to be led out through said device, said cable including a single conductor essentially axially located within insulating means, a plastic tubular member concentric with and overlying said insulating means, a metal tube surrounding said plastic tubular member and being provided adjacent both ends thereof with means compressing said plastic tubular member radially inwardly into fluid-tight engagement with said cable.

2. Fluid-tight lead-out device for electric conductors, according to claim 1, wherein said cable extends through a stuffing box which bears on the metal tube surrounding said cable.

3. Apparatus as defined in claim 1, wherein said last-mentioned means are groove means.

4. A fluid-tight lead-out device comprising means defining a pressurized fluid chamber provided with an outlet aperture, at least one cable extending through said aperture to be led out through said device, said cable including a conductor and insulating means coaxially surrounding said conductor, a plastic tubular member adapted to be slid over said cable, said plastic tubular member being positioned concentrically around said insulating means with one end thereof extending through said aperture into said chamber, a metal tube surrounding said plastic tubular member and being provided adjacent both ends thereof with groove means compressing said plastic tubular member radially inwardly into fluid-tight engagement with said cable, and means for sealing said metal tube in said aperture.

5. A fluid-tight lead-out device for an electric conductor comprising means provided with outlet aperture means, cable means including conductor means surrounded by insulating means, plastic tubular means surrounding said insulating means, metallic tubular means surrounding said plastic tubular means, both said plastic tubular means and said metallic tubular means extending through said aperture means into an inner region of said device, said metallic tubular means being provided with means compressing said plastic tubular means into fluid-tight engagement with said cable means at least in the region within said device, and means for sealing said metallic tubular means in said aperture means.

References Cited in the file of this patent

UNITED STATES PATENTS

| 2,310,423 | Gold | Feb. 9, 1943 |
| 2,549,647 | Turenne | Apr. 17, 1951 |
| 2,800,523 | Sidenmark et al. | July 23, 1957 |

FOREIGN PATENTS

| 553,638 | Germany | June 29, 1932 |
| 734,962 | Germany | May 3, 1943 |